United States Patent Office 3,544,533
Patented Dec. 1, 1970

3,544,533
PROCESS AND MODIFIED CATALYST FOR THE POLYMERIZATION OF α-OLEFINS
Max Peter Dreyfuss, Akron, Ohio, assignor to The B. F. Goodrich Company, New York, N.Y., a corporation of New York
No Drawing. Filed Aug. 3, 1967, Ser. No. 658,030
Int. Cl. C08f *3/10, 15/04;* B01j *11/84*
U.S. Cl. 260—80.78          12 Claims

ABSTRACT OF THE DISCLOSURE

α-Olefins are polymerized with a modified Ziegler type catalyst whereby the molecular weight of the α-olefin polymers may be controlled. The modified catalyst is prepared from a transition metal compound, a metal alkyl reducing agent and a modifying agent which is a Group II–B metal salt of a carboxylic acid.

BACKGROUND OF THE INVENTION

This invention relates to a method for regulating the molecular weight of α-olefin polymers. More particularly, the invention relates to a method for the regulation of the molecular weight of α-olefin polymers prepared with reduced metal catalysts modified with metal salts of carboxylic acids.

The homopolymerization and copolymerization of α-olefins such as ethylene, propylene and butene-1 with reduced metal catalysts, commonly referred to as Ziegler catalysts, are well known. Polymerizations with reduced metal catalysts are carried out by contacting the monomers to be polymerized with a transition metal compound and a metal alkyl reducing agent at moderate pressures. The polymers obtained with such catalysts typically have very high molecular weights, so high that in many cases the polymers are not useful for applications which require ease of processability and rapid extrusion. To a limited extent, the molecular weight of these α-olefin polymers has been controlled by the choice of the particular reduced metal catalyst or by varying the ratio of the metal compound to the reducing agent.

More recently, in an effort to extend the ability to regulate the molecular weight of polymers obtained through this type of polymerization, it has been suggested that the polymerizations be conducted in the presence of compounds capable of terminating growing polymer chains. For example, U.S. Pat. 3,051,690 describes a process for polymerizing α-olefins wherein hydrogen is utilized as the molecular weight controlling agent. Also, British Pats. 889,852 and 902,845 disclose the use of organometallic compounds such as diethyl zinc and diethyl cadmium as molecular weight regulators for the homo- and copolymerization of ethylene. The use of these compounds, although effective, is not without certain disadvantages. Organometallic compounds are expensive and difficult to handle, igniting spontaneously when exposed to air. Hydrogen presents an explosive hazard and its limited solubility in the solvents typically employed for the polymerization makes it difficult to control the molecular weight of the polymers within the desired limits due to the fluctuations of hydrogen concentration.

SUMMARY OF THE INVENTION

I have now found quite unexpectedly that the molecular weight of α-olefin polymers and copolymers, obtained by polymerization with reduced metal catalysts, can be effectively controlled over a wide range by modifying the reduced metal catalyst with metal salts of carboxylic acids. The reduced metal catalyst to be modified will consist of a transition metal compound reacted with a metal alkyl reducing agent, preferably a vanadium or titanium compound reduced with an organoaluminum compound. The modified catalysts of the present invention are economical and convenient to use. By varying the amount of metal carboxylate modifier, the molecular weights of the α-olefin polymerizates can be varied over a wide range. An important aspect of the present invention is its use for the polymerization of ethylene and propylene; and for the interpolymerization of ethylene and propylene with third monomers containing multiple unsaturation to produce sulfur curable polymers of controlled molecular weight.

DETAILED DESCRIPTION OF THE INVENTION

In general, any reduced metal catalyst formed by reacting: a transition metal compound, that is, compounds of metals of Groups IV–B, V–B or VI–B of the Periodic Table (as published in Fundamental Chemistry, 2nd ed., by H. G. Deming); a reducing agent comprising a metalloorganic compound of Groups I–A, II–A or III–A of said table; and a Group II–B metal carboxylate can be used in carrying out the process of the present invention. For purposes of clarification, the metals referred to in the above-mentioned groups are:

I–A—Li, Na, K
II–A—Mg, Ca
II–B—Zn, Cd, Hg
III–A—Al
IV–B—Ti, Zn, Hf
V–B—V, Nb, Ta
V–IB—Cr, Mo, W

The group IV–B, V–B or VI–B metal compounds preferably used to prepare the catalyst of the present invention are vanadium and titanium compounds. The particular vanadium or titanium compounds may be inorganic salts such as halides, oxyhalides and the like, or organic complexes and salts. Such compounds include: vanadium tetrachloride, vanadium oxytrichloride, vanadium acetylacetonate, vanadium oxyacetylacetonate, titanium tetrachloride, tetrabutyl titanate, titanium acetylaceonate, titanium chloroacetate and the like.

Compounds employed as reducing agents for the transition metal compounds will be metallo-organic compounds of Group I–A, II–A or III–A metals. Typical reducing agents will include: organoalkali metal compounds such as butyllithium, amylsodium, phenylsodium, phenylpotassium and the like; organo-alkaline earth metal compounds such as dimethyl magnesium, diethylmagnesium, ethyl magnesium bromide or chloride, diphenyl magnesium, phenyl magnesium bromide or chloride and the like; and organoaluminum compounds. Excellent results have been obtained when the reducing agent is an organoaluminum compound, and more specifically an aluminum trialkyl having the structural formula

wherein $R_1$, $R_2$ and $R_3$ are alkyl radicals, either the same or different, having from 1 to 8 carbon atoms, such as methyl-, ethyl-, propyl-, isopropyl-, butyl-, amyl and the like; or an alkylaluminum halide or hydride having the structural formula $R'_x AlR''_{3-x}$ wherein $R'$ is an alkyl radical containing from 1 to 8 carbon atoms, $R''$ is hydrogen or a halogen such as bromine or chlorine, and $x$ is a number greater than 0.5 but less than 3. Such preferred compounds of the latter types include: triethylaluminum, tripropylaluminum, triisopropylaluminum, triisobutyl-aluminum, dimethylaluminum chloride, diethylaluminum chloride, diethylaluminum bromide, ethylaluminum chloride, ethylaluminum sesquichloride, diethylaluminum hydride, ethylaluminum dihydride, diisobutylaluminum hydride, and the like.

Metal carboxylates used as modifiers with the transition metal compound and the reducing agent correspond to the structural formula

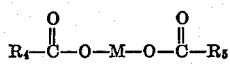

wherein $R_4$ and $R_5$ are alkyl radicals, either the same or different, containing from 1 to 23 carbon atoms, or a cycloalkyl or aryl radical, and M is a metal selected from Group II–B of the Periodic Table. Excellent results have been obtained when the modifier employed is a zinc salt of a carboxylic acid containing from 2 to 20 carbon atoms such as zinc acetate, zinc propionate, zinc butyrate, zinc valerate, zinc caproate, zinc caprylate, zinc pelargonate, zinc laurate, zinc myristate, zinc palmitate, zinc margarate, zinc stearate and zinc arachidate. Mixtures of one or more of the metal carboxylates may be used if desired. The exact role which the metal carboxylates play in the polymerization, that is, the mechanism by which the molecular weight of the α-olefin polymers is controlled, is not understood; except that they modify the catalyst in such a way to enable the production of polymers whose molecular weights are lower than would normally be obtained in the absence of a modifier.

In general, the molar ratios of the three components comprising the catalyst system of the present invention can be varied over a wide range without destroying the molecular weight altering capabilities of the catalyst. Molar ratios of reducing agent to transition metal compound can range between about 1:1 to about 50:1 or higher, however, they will generally range between about 5:1 to about 30:1. In general, the molecular weight of the polymers will decrease as the amount of metal carboxylate is increased. The molar ratio of the metal carboxylate modifier to the transition metal compound will typically range between about 0.05:1 to about 7:1, however, excellent results are obtained without adversely affecting the catalyst efficiency when the ratio is maintained between about 0.1:1 to 3:1. It has been found especially advantageous when a vanadium compound, an organoaluminum reducing agent and a zinc carboxylate make up the catalyst components, that the Al/V molar ratio be maintained between about 7:1 to 20:1 with a Zn/V molar ratio between about 0.3:1 to 1:1. About 0.02 to 0.65 mM. of the transition metal compound will be charged per liter of diluent used.

This invention is applicable to the polymerization of α-olefins, said compounds having the general formula $CH_2=CHR$ where R is a hydrogen or an alkyl group containing from 1 to 6 carbon atoms. The catalyst system of the present invention is especially preferred for use when ethylene or propylene are to be polymerized. In addition to being useful for the preparation of homopolymers, the catalyst may also be used to produce controlled molecular weight copolymers from two or more α-olefins. For example, the metal carboxylate-modified catalyst has proved useful as a means to regulate the molecular weight of polymerizates obtained when ethylene and propylene are copolymerized. Excellent results have also been obtained for terpolymerizations of ethylene and propylene with third monomers containing multiple unsaturation such as 1,4-hexadiene, 2-methyl-1,4-hexadiene, 1,4,9-decatriene, the dimethyl-1,4,9-decatrienes, dicyclopentadiene, vinyl cyclohexene, butenyl cyclohexene, vinyl norbornene, ethylidene norbornene, methylene norbornene, methyl norbornadiene, methyl tetrahydroindene and the like. Such third monomers are capable of introducing unsaturation into the resulting terpolymer, thereby providing cure-sites for subsequent vulcanization. Such terpolymers will typically contain about 0.3 to 10% by weight of the third monomer with about 30 to 80% by weight ethylene and about 20 to 70% by weight propylene.

The polymerization process of the present invention is generally, though not necessarily, conducted in a liquid phase. The liquid phase may be an inert hydrocarbon diluent such as the liquid aliphatic hydrocarbons, cycloaliphatic hydrocarbons, aromatic hydrocarbons or chlorinated hydrocarbons. Such diluents include: hexane, heptane, cyclohexane, benzene, toluene, xylene, chlorobenzene, perchloroethylene and the like. The inert diluent may be a solvent for the polymer, however, it is often advantageous to employ hydrocarbon diluents for which the resulting polymer shows no affinity, thus the polymer particles will be suspended in the diluent. Suspension polymerizations are useful in that the polymer does not require costly precipitation with alcohol, but instead may be recovered directly from the reactor. Suspension processes which employ an excess of liquid propylene as the hydrocarbon diluent for copolymerizations and terpolymerizations with ethylene and propylene are a particularly important aspect of this invention.

Polymerizations conducted with the modified catalyst may be either of the batch or continuous type. Batch techniques are generally employed for small scale operations; while continuous polymerizations are considered more desirable for large scale commercial operations.

Charging techniques for the monomers and modified catalyst system will vary depending on the type of operation; whether a solution, suspension or bulk system; the monomers to be polymerized; the particular modified catalyst employed, etc., as is well known to the person skilled in the art. Similarly, the reaction temperature and pressure will be varied accordingly. In general, however, the polymerizations will be conducted at temperatures in the range of from about −80 to about 150° C. and more preferably from about −50 to about 70° C. Pressures employed will generally range from atmospheric up to about 2000 p.s.i. Pressures exceeding 2000 p.s.i. may be used if desired, however, they generally present no particular advantage. Excellent results have been obtained when the pressure has been maintained from atmospheric up to about 250 p.s.i.

The catalyst of the present invention is prepared by mixing the transition metal compound, the reducing agent and the metal carboxylate in an inert diluent of the same type employed as a reaction medium for the polymerization, or if desired, the catalyst components may be mixed together by themselves. It is generally preferred that a diluent be employed to give better control of the exothermic reaction which results. To further reduce the exotherm, it is convenient to mix the catalyst components at temperatures below about 0° C. The order for mixing the catalyst component together is not critical. The metal salts of the carboxylic acids may be added as such or they may be dissolved in a suitable solvent and added in solution. The latter technique is most often employed since more uniform and intimate contact of the catalyst components is achieved in this manner. It is often advantageous with certain of the less soluble metal carboxylates to pre-react the salt with a portion of the reducing agent prior to contacting with the reduced transition metal compound. This method for preparing the catalyst can be conveniently conducted in the polymerizer containing the monomers and diluent prior to the addition of the transition metal compound. If desired the catalyst components can be mixed together prior to the reaction and allowed to age for a short time before charging. Catalyst may be charged to the reactor continuously, incrementally or at one time, depending on the system employed.

The molecular weight of the polymers is indicated by the dilute solution viscosity (DSV), measured at 25° C. on a toluene solution containing 0.2 grams polymer/100 grams toluene. The polymer is dissolved in the toluene by heating at 110° C.

The following examples serve to illustrate the invention more fully, however, they are not intended to limit the scope thereof. In these examples all parts and percentages are by weight unless indicated otherwise. The composition of the ethylene/propylene copolymers and terpolymers was determined by infrared analysis.

EXAMPLE I

Propylene was polymerized using a triethylaluminum/titanium tetrachloride catalyst system. To demonstrate the molecular weight regulating ability of the modified catalysts, two polymerizations were run; one (A) carried out using an unmodified catalyst while the second polymerization (B) was conducted with a zinc stearate-modified triethylaluminum/titanium tetrachloride catalyst. The polymerizations in both instances were conducted by charging nitrogen-purged polymerization vessels with 500 mls. of dry hexane. For run (B), 0.21 g. of zinc stearate was added to the polymerizer as a dry solid prior to the hexane addition. The hexane was then saturated with propylene by charging the gaseous hydrocarbon through a dip-tube at a constant rate at about 19° C. Catalyst components were then added: first, 6.0 mls. of a hexane solution (aged 30 minutes) containing 25% by volume triethylaluminum and then 10 ml. of a triethylaluminum/titanium tetrachloride slurry which had been aged for 25 minutes, the slurry being prepared by mixing 20 mls. hexane, 0.36 ml. triethylaluminum and 0.58 ml. titanium tetrachloride. The overall Al/Ti ratio of both polymerization systems was 4.6 while the (B) run had in addition a Zn/Ti ratio of 0.144. Throughout the polymerization agitation was maintained and propylene metered in at a constant rate so that in the system there was always an excess of propylene. Throughout the polymerization the temperature developed in the systems did not exceed 40° C. After two hours, the reactions were terminated by the addition of 5 mls. of ethanol. The polymer slurry was then washed three times with 100 ml. portions of a 10% hydrochloric acid/methanol solution and three times with 100 ml. portions of methanol. The insoluble polymer was then separated from the hexane. The hexane solution was concentrated to about 300 mls. and treated with ethanol to precipitate additional polymer, hereafter referred to as the hexane-solubles. Both the hexane-soluble and hexane-insoluble polymers were vacuum dried, weighed and DSV's obtained. The results are set forth in Table I and clearly point out that the viscosity of both the hexane-insoluble and hexane-soluble polypropylene is decreased by modifying the catalyst with zinc stearate. Varying degrees of molecular weight modification can be obtained by chainging the Al/Ti ratio or Zn/Ti ratio.

TABLE I

| | Run A | Run B |
|---|---|---|
| Polymer obtained (grams) | 34.2 | 33.8 |
| Hexane-insoluble | 12.5 | 13.1 |
| Hexane-soluble | 21.7 | 20.7 |
| DSV: | | |
| Hexane-insoluble [1] | 2.74 | 2.12 |
| Hexane-soluble | 0.87 | 0.57 |

[1] DSV run in Decalin at 135° C.

EXAMPLE II

Zinc stearate- and zinc benzoate-modified diethylaluminum chloride/vanadium acetylacetonate catalysts were employed to copolymerize ethylene and propylene. The polymerization technique described in Example I was used with a few modifications. After saturating the hexane with propylene at −10° C. and just prior to the addition of the catalyst, a mixtuer of about 40 mol percent ethylene and about 60 mol percent propylene was fed into the reactor. This mixture of gaseous monomers was added continuously at a rapid rate throughout the polymerization. Also, the temperature in the polymerizer was maintained at about −10° C. for the entire run by means of a cooling bath. The polymers were recovered by alcohol coagulation. Table II sets forth the experimental details, as well as the polymer viscosities, in tabular form.

TABLE II

| | Catalyst Components | | | | | | | | |
|---|---|---|---|---|---|---|---|---|---|
| Run | Vanadium acetylacetonate [1] (mM.) | Diethylaluminum chloride (mM.) | Al/V | Modifier Compound | mM. | Zn/V | Polymer yield/time (grams/min.) | Percent propylene in polymer | DSV |
| A | 0.16 | 0.65 | 4 | | | 0 | 9.8/14 | 50 | 4.57 |
| B | 0.16 | 0.64 | 4 | Zinc stearate [2] | 0.08 | 0.5 | 12.9/14 | 59 | 3.67 |
| C | 0.16 | 0.80 | 5 | | | 0 | 11.2/16 | 50 | 4.05 |
| D | 0.16 | 0.80 | 5 | Zinc stearate [2] | 0.08 | 0.5 | 17.3/10 | 68 | 2.39 |
| E | 0.08 | 1.2 | 15 | | | 0 | 10.5/10.5 | 43 | 3.22 |
| F [2] | 0.08 | 1.2 | 15 | Zinc stearate [2] | 0.08 | 1 | 17.7/12 | 52 | 1.72 |
| G | 0.08 | 4.0 | 50 | | | 0 | 24.4/17 | 60 | 2.24 |
| H | 0.08 | 4.0 | 50 | Zinc stearate [2] | 0.08 | 1 | 25.6/20 | 53 | 1.04 |
| I | 0.08 | 1.2 | 15 | Zinc benzoate [2] | 0.08 | 1 | 26.7/25 | 52 | 1.65 |
| J | 0.08 | 1.2 | 15 | Zinc benzoate [3] | 0.08 | 1 | 15.8/30 | 49 | 1.34 |
| K | 0.08 | 0.9 | 11 | Zinc benzoate [3] | 0.08 | 1 | 16.5/30 | 60 | 2.11 |

[1] Millimoles abbreviated mM.
[2] Added to the polymerizer as a solid prior to addition of other catalyst components.
[3] Pre-reacted with 0.32 mM. diethylaluminum chloride and this slurry charged to the polymerizer.

EXAMPLE III

Ethylene and propylene were terpolymerized in the usual manner with 5(6)-methyl tetrahydroindene using vanadium acetylacetonate/diethylaluminum chloride and vanadium oxytrichloride/diethylaluminum chloride catalysts modified with zinc stearate. The third monomer was charged to the reactor immediately following the start of the ethylene/propylene feed and prior to the catalysts charge. Details of the runs are set forth in Table III.

The ethylene/propylene/methyl tetrahydroindene terpolymers provide useful vulcanizates after a conventional sulfur cure. They will typically have tensile strengths of about 2500 to 3000 p.s.i., $M_{300}$ of about 1200 to 1500 p.s.i. and about 500 to 600% elongation when cured in a typical 80 black/55 oil recipe.

TABLE III

| | | Catalyst Components | | | | | | | Weight percent methyl tetrahydroindene in polymer | |
|---|---|---|---|---|---|---|---|---|---|---|
| Run | Methyl tetrahydroindene (mls.) | Vanadium compound (mM.) | Diethyl aluminum chloride (mM.) | Al/V | Zinc stearate [1] (mM.) | Zn/V | Reaction time (min.) | Polymer yield (grams) | Percent propylene in polymer | DSV |
| A | 15 | Vanadium acetylacetonate (0.16) | 1.2 | 7.5 | | | 38 | 24.2 | 45 | 5.2 | 2.74 |
| B | 15 | Vanadium acetylacetonate (0.16) | 1.2 | 7.5 | 0.16 | 1 | 55 | 32.3 | 47 | 5.0 | 1.45 |
| C | 10 | Vanadium oxytrichloride (0.16) | 1.2 | 7.5 | | | 60 | 12.3 | 38 | 3.7 | |
| D | 10 | Vanadium oxytrichloride (0.16) | 1.2 | 7.5 | 0.16 | 1 | 60 | 21.2 | 40 | 4.3 | 2.21 |
| E | 10 | Vanadium oxytrichloride (0.32) | 2.4 | 7.5 | 0.08 | 0.25 | 60 | 28.1 | 49 | 4.7 | |

[1] Added in solid form prior to addition of V and Al compounds.

EXAMPLE IV

A zinc acetate-modified diethylaluminum chloride/vanadium acetylacetonate catalyst was used for the copolymerization of ethylene and propylene. The procedure employed was identical to that described in Example II. Table IV below sets forth the details of run.

TABLE IV

| | A | B |
|---|---|---|
| Vanadium acetylacetonate (mM.) | 0.08 | 0.08 |
| Diethylaluminum chloride (mM.) | 0.56 | 0.56 |
| Zinc acetate (mM.) | | 0.08 |
| Reaction time (min.) | 10 | 5 |
| Polymer yield (grams) | 6.90 | 2.99 |
| Percent propylene in polymer | 39 | 46 |

The zinc acetate was reacted with 0.32 mM. of the diethylaluminum chloride and allowed to age for 24 hours to use in this particular run. The DSV of the ethylene/propylene polymer obtained with the zinc acetate modified catalyst was 3.91; while the DSV of the ethylene/propylene polymer prepared with the conventional (unmodified) catalyst was 7.66.

EXAMPLE V

Similar to Example IV, ethylene and propylene were copolymerized. The catalyst employed comprises 1.2 mM. diethylaluminum chloride and 0.16 mM. vanadium acetylacetonate modified with 0.04 mM. cadmium stearate which was reacted with a portion of the diethylaluminum chloride prior to use. 14.74 grams of a polymer containing 39 mol percent propylene and having a DSV of 2.88 was produced after about 10 minutes of polymerization. When ethylene and propylene were copolymerized with a catalyst comprised of the same molar proportions of diethylaluminum chloride and vanadium acetylacetonate but with no cadmium stearate modifier, the polymer had a DSV of 3.32 and contained 59% propylene.

EXAMPLE VI

To demonstrate the versatility of the modified catalysts of this invention, ethylene, propylene and methyl tetrahydroindene were interpolymerized with a zinc acetate modified diethylaluminum chloride/vanadium acetylacetonate catalyst using a suspension process. The polymerizer consisted of a 2-liter glass-bowl reactor equipped with pressure and temperature control devices. After conditioning of the reactor it was filled with propylene at $-10°$ C. and ethylene charged so that the ethylene/propylene mol ratio was 0.04. Methyl tetrahydroindene was then charged to the reactor so that the third monomer/propylene mol ratio was 0.05. The pressure developed in the reactor was 58 p.s.i.g. The catalsyt solutions were then charged to initiate the polymerization and additional catalyst added at two minute intervals thereafter to maintain a steady polymerization rate. The zinc acetate and diethylaluminum chloride were prereacted in benzene and the benzent solution fed into the reactor. Ethylene and methyltetrahydroindene were fed automatically upon demand to maintain the initial mol ratios. The temperature was maintained at $-10°$ C. throughout the polymerization and the pressure kept steady at about 56–59 p.s.i.g. After approximately 76 min. the polymerization was shortstopped by the addition of 200 ml. ethanol. The final catalyst level was 0.28 mM./l. vanadium acetylacetonate, 2.8 mM./l. diethyl aluminum chloride and 0.28 mM./l. zinc acetate. 171 grams of terpolymer was obtained. The polymer had a DSV of 1.76 and infrared analysis showed it to contain 47% propylene and 3.8% methyl tetrahydroindene.

For comparative purposes, a suspension polymerization was conducted in an identical manner except that an unmodified diethylaluminum chloride/vanadium acetylacetonate catalysts was employed (2.80 mM. Al/l./0.28 mM. V/l.). The resulting terpolymer contained 44% propylene and 3.1% methyl tetrahydroindene and had a DSV of 3.63.

The above examples clearly demonstrate the ability of the metal carboxylate-modified catalysts of the present invention to produce $\alpha$-olefin polymers having reduced molecular weights. The modified catalysts are useful for homo- and copolymerizations of $\alpha$-olefins and also may be employed advantageously to produce terpolymers of ethylene and propylene with third monomers containing multiple unsaturation. Such terpolymers are sulfur curable and the vulcanizates have a good range of physical properties. The catalyst is extremely versatile, capable of being used for solution or suspension polymerizations with equal effectiveness. A wide variety of catalyst components may be used to make up the catalyst and also the mol ratios of the various catalyst components may be varied over wide ranges. The amount of modifier component employed in making up the catalyst provides a convenient means to control the extent to which the molecular weight of the resulting polymerizate will be lowered.

I claim:

1. A polymerization process for the production of controlled molecular weight $\alpha$-olefin polymers wherein at least one $\alpha$-olefin having the structure $CH_2=CHR$ wherein R is a hydrogen or an alkyl group containing from 1 to 6 carbon atoms is contacted with a catalyst consisting essentially of (1) a vanadium compound selected from the group consisting of vanadium halides, vanadium oxyhalides, vanadium acetylacetonate and vanadium oxyacetylacetonate; (2) a metallo-organic reducing agent selected from the group consisting of

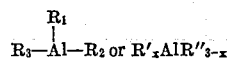

wherein $R_1$, $R_2$, $R_3$ and $R'$ are alkyl radicals containing from 1 to 8 carbon atoms, $R''$ is hydrogen, bromine or chlorine and $x$ is a number greater than 0.5 but less than 3; and (3) a metal carboxylate of the structural formula

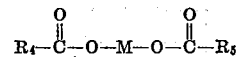

wherein $R_4$ and $R_5$ are alkyl radicals containing from 1 to 23 carbon atoms or cycloalkyl and M is zinc or cadmium; the molar ratio of (2) to (1) is about 1:1 to about 50:1 and the molar ratio of (3) to (1) is about 0.05:1 to about 7:1.

2. The polymerization process of claim 1 wherein (1) is selected from the group consisting of vanadium tetrachloride, vanadium oxytrichloride and vanadium acetylacetonate and the molar ratio of (2) to (1) is between about 5:1 to 30:1 and the molar ratio of (3) to (1) is between about 0.1:1 to about 3:1.

3. The polymerization process of claim 2 wherein (2) is selected from the group consisting of triethyl aluminum, triisobutyl aluminum, diethyl aluminum chloride and ethyl aluminum sesquichloride and (3) is a zinc salt of a carboxylic acid wherein $R_4$ and $R_5$ are alkyl radicals containing from 2 to 20 carbon atoms.

4. The polymerization process of claim 1 wherein ethylene and propylene are copolymerized, (2) is selected frmo the group consisting of triethyl aluminum, triisobutyl aluminum, diethyl aluminum chloride or ethyl aluminum sesquichloride and (3) is a zinc salt of a carboxylic acid wherein $R_4$ and $R_5$ are alkyl radicals containing from 2 to 20 carbon atoms.

5. The polymerization process of claim 4 wherein the ethylene and propylene are interpolymerized with a third monomer containing multiple unsaturation to form a polymer containing about 0.3 to 10% by weight of a third monomer, about 30 to 80% by weight ethylene and 20 to 70% by weight propylene.

6. The polymerization process of claim 5 wherein the third monomer is selected from the group consisting of 1,4-hexadiene, dimethyl-1,4,9-decatriene, methyl norbornene, dicyclopentadiene and methyl tetrahydroindene.

7. The polymerization process of claim 6 wherein the molar ratio of (2) to (1) is about 1:1 to 50:1 and the molar ratio of (3) to (1) is about 0.05:1 to 7:1, (1) is selected from the group consisting of vanadium tetrachloride, vanadium oxytrichloride and vanadium acetylecetonate, and (2 is diethyl aluminum chloride and (3) is a zinc stearate.

8. A catalyst composition consisting essentially of (1) a vanadium compound selected from the group consisting of vanadium halides, vanadium oxyhalides, vanadium acetylacetonate and vandium oxycetylcetonte; (2) a metallo organic reducing agent selected from the group consisting of

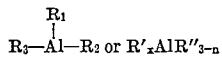

wherein $R_1$, $R_2$, $R_3$ and $R'$ are alkyl radicals containing from 1 to 8 carbon atoms, $R''$ is hydrogen, bromine or chlorine and $x$ is a number greater than 0.5 but less than 3; and (3) a metal carboxylate of the structural formula

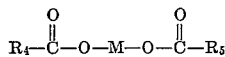

wherein $R_4$ and $R_5$ are alkyl radicals containing from 1 to 23 carbon atoms or cycloalkyl and M is zinc or cadmium; and the molar ratio of (2) to (1) is about 1:1 to about 50:1 and the molar ratio of (3) to (1) is about 0.05:1 to about 7:1.

9. The catalyst composition of claim 8 wherein (1) is selected from the group consisting of vanadium tetrachloride, vanadium oxytrichloride and vanadium acetylacetonate, (2) is selected from the group consisting of triethylaluminum, triisobutylaluminum, diethyl aluminum chloride and ethylaluminum sesquichloride, the molar ratio of (2) to (1) is between about 5:1 to 30:1 and the molar ratio of (3) to (1) is between about 0.1:1 to 3:1.

10. The catalyst composition of claim 9 wherein (3) is a zinc salt of a carboxylic acid wherein $R_4$ and $R_5$ are alkyl radicals containing from 2 to 20 carbon atoms.

11. The catalyst composition of claim 10 wherein (1) is vanadium acetylacetonate and (2) is diethyl aluminum chloride.

12. The catalyst composition of claim 10 wherein (1) is vanadium oxytrichloride and (2) is diethyl aluminum chloride.

References Cited

UNITED STATES PATENTS

| | | | |
|---|---|---|---|
| 2,971,925 | 2/1961 | Winkler et al. | 260—94.9E |
| 3,035,035 | 5/1962 | Mensikova et al. | 260—94.9E |
| 3,234,383 | 2/1966 | Barney | 260—94.9E |
| 3,026,312 | 3/1962 | Hagemeyer et al. | 260—94.9E |

FOREIGN PATENTS

| | | | |
|---|---|---|---|
| 737,044 | 6/1966 | Canada | 260—94.9E |
| 889,852 | 2/1962 | Great Britain | 260—88.2 |
| 902,845 | 8/1962 | Great Britain | 260—94.9E |

JAMES A. SEIDLECK, Primary Examiner

U.S. Cl. X.R.

252—429, 431; 260—88.2, 93.7, 94.9